(12) United States Patent
Sawahata et al.

(10) Patent No.: US 9,710,108 B2
(45) Date of Patent: Jul. 18, 2017

(54) TOUCH SENSOR CONTROL DEVICE HAVING A CALIBRATION UNIT FOR CALIBRATING DETECTION SENSITIVITY OF A TOUCH EXCEPT FOR A MASK REGION

(71) Applicant: SHARP KABUSHIKI KAISHA, Osaka-shi, Osaka (JP)

(72) Inventors: Junichi Sawahata, Osaka (JP); Takashi Ishikawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/035,286

(22) PCT Filed: Oct. 21, 2014

(86) PCT No.: PCT/JP2014/077933
§ 371 (c)(1),
(2) Date: May 9, 2016

(87) PCT Pub. No.: WO2015/087621
PCT Pub. Date: Jun. 18, 2015

(65) Prior Publication Data
US 2016/0291792 A1    Oct. 6, 2016

(30) Foreign Application Priority Data

Dec. 11, 2013   (JP) .................. 2013-256373

(51) Int. Cl.
*G06F 3/041*   (2006.01)
*G06F 3/044*   (2006.01)

(52) U.S. Cl.
CPC ............ *G06F 3/0418* (2013.01); *G06F 3/044* (2013.01); *G06F 3/0412* (2013.01)

(58) Field of Classification Search
CPC ...................................... G06F 3/0418
USPC ......................................... 345/173
See application file for complete search history.

(56) References Cited

U.S. PATENT DOCUMENTS

| | | | |
|---|---|---|---|
| 2009/0207145 A1* | 8/2009 | Tsuzaki | G06F 3/0412 345/173 |
| 2010/0053348 A1* | 3/2010 | Yoshimoto | G06F 3/0412 348/218.1 |
| 2010/0060609 A1 | 3/2010 | Doi et al. | |

(Continued)

FOREIGN PATENT DOCUMENTS

| JP | 2010-61598 A | 3/2010 |
|---|---|---|
| JP | 2010-257046 A | 11/2010 |

(Continued)

*Primary Examiner* — Long D Pham
(74) *Attorney, Agent, or Firm* — Birch, Stewart, Kolasch & Birch, LLP

(57) ABSTRACT

A touch sensor control device which performs appropriate calibration is realized. A touch sensor control device (3) of one aspect of the invention controls a touch sensor (5) and includes a touch position detection unit (14) which specifies a touch position on a detection surface of the touch sensor; a mask generation unit (15) which sets a mask region according to the touch position; and a calibration value generation unit (16) which performs, for a region except the mask region, calibration of detection sensitivity of a touch.

6 Claims, 8 Drawing Sheets

(56) References Cited

U.S. PATENT DOCUMENTS

| | | | |
|---|---|---|---|
| 2010/0220077 A1* | 9/2010 | Fukunaga | G06F 3/0412 345/175 |
| 2013/0150132 A1 | 6/2013 | Izumi et al. | |
| 2013/0187882 A1* | 7/2013 | Kim | G06F 3/041 345/173 |
| 2014/0267132 A1* | 9/2014 | Rabii | G06F 3/0418 345/174 |
| 2015/0268736 A1* | 9/2015 | Cao | G06F 3/017 345/156 |

FOREIGN PATENT DOCUMENTS

| | | |
|---|---|---|
| JP | 2012-048340 A | 3/2012 |
| JP | 2012-118850 A | 6/2012 |
| JP | 2013-246557 A | 12/2013 |

* cited by examiner

TOUCH SENSOR CONTROL DEVICE HAVING A CALIBRATION UNIT FOR CALIBRATING DETECTION SENSITIVITY OF A TOUCH EXCEPT FOR A MASK REGION

TECHNICAL FIELD

The present invention relates to a touch sensor control device, and a touch panel system or the like, which includes the same.

BACKGROUND ART

In recent years, there are increasing cases where a touch panel system which receives an instruction from a user by detecting a position of an indicator (for example, a finger of the user, a stylus pen, or the like; the same shall apply hereinafter) which is in contact with or proximate to a detection surface of a touch panel is mounted to an electronic information apparatus such as a cellular phone or a personal computer. Particularly, there are increasing cases where a capacitive touch panel of a projection type, which allows multi-touch, is mounted to an electronic information apparatus.

In such a touch panel system, the indicator which is in contact with or proximate to the detection surface is detected based on a processing result of a signal generated by the touch panel. However, the signal generated by the touch panel is affected by various influences such as stain adhering to the detection surface and aging degradation in addition to non-uniformity of a structure of the touch panel. Accordingly, in a case where the indicator is detected by directly using the processing result of the signal generated by the touch panel, sensitivity of the detection surface for detecting an indicator becomes non-uniform.

When the detection sensitivity of the detection surface for detecting the indicator becomes non-uniform in this manner, it may happen that it is easy to detect an indicator at a certain position in the detection surface while it is difficult to detect the indicator at a different position in the detection surface, for example.

Then, it is considered that calibration (correction) is executed based on the processing result of the signal generated by the touch panel in a state where there is no indicator which is in contact with or proximate to the detection surface (hereinafter, referred to as "non-indicated state"). When the calibration is executed, variations of the detection sensitivity due to the above-described various influences are suppressed in a processing result of a signal generated by the touch panel, which is to be obtained thereafter. Thus, it becomes possible to make the detection sensitivity of the detection surface for detecting an indicator more uniform.

Since distribution of electrostatic capacitance of the touch panel changes due to a change in temperature, a change with time, and the like, it is preferable that the calibration be regularly performed not only at a time of manufacture but also at a time of turning on the power or the like.

However, a calibration is not always executed in the non-indicated state. For example, when the calibration is executed in a state where the indicator is in contact with or proximate to a certain position in the detection surface, in subsequent processing, an influence of the indicator which is in contact with or proximate to the detection surface is suppressed at this certain position. Accordingly, in the certain position, the detection sensitivity of the detection surface for indicating an indicator becomes significantly deteriorated and, in some cases, it is not allowed to detect the indicator.

In PTL 1, described is that, in a case where a human sensor senses presence of an approaching object during automatic calibration, the automatic calibration of a touch panel is stopped. Incorrect calibration is thereby prevented from being performed.

CITATION LIST

Patent Literature

PTL 1: Japanese Unexamined Patent Application Publication No. 2012-118850 (published on Jun. 21, 2012)

SUMMARY OF INVENTION

Technical Problem

In order to perform appropriate calibration, it is desired to perform calibration in the non-indicated state.

However, in a configuration described in PTL 1, when a person is proximate to the touch panel for a long time period, the calibration is not allowed to be performed during this time period. Therefore, there is a possibility that a time period during which the calibration is not performed continues for a long time. Accordingly, erroneous detection of a touch position may be caused.

According to one aspect of the invention, it is possible to realize a touch sensor control device which performs appropriate calibration.

Solution to Problem

A touch sensor control device according to one aspect of the invention is a touch sensor control device which controls a touch sensor, including: a touch position specification unit which specifies a touch position on a detection surface of the touch sensor; a mask setting unit which sets a mask region according to the touch position; and a calibration unit which performs, for a region of the detection surface except the mask region, calibration of detection sensitivity of a touch.

A controlling method of a touch sensor according to one aspect of the invention includes: a touch position specification step of specifying a touch position on a detection surface of the touch sensor; a mask setting step of setting a mask region according to the touch position; and a calibration step of performing, for a region of the detection surface except the mask region, calibration of detection sensitivity of a touch.

Advantageous Effects of Invention

According to one aspect of the invention, it is possible to perform appropriate calibration at a desired timing.

DESCRIPTION OF EMBODIMENTS

Hereinafter, embodiments of the invention will be described in detail. When a configuration described in a specific item (embodiment) below is the same as a configuration described in a different item, description thereof will be omitted in some cases. In addition, for convenience of description, the same reference sign will be assigned to a member having the same function as that of a member indicated in each item, and description thereof will be omitted as appropriate.

Embodiment 1

(Configuration of Electronic Information Apparatus)

Figure 1:
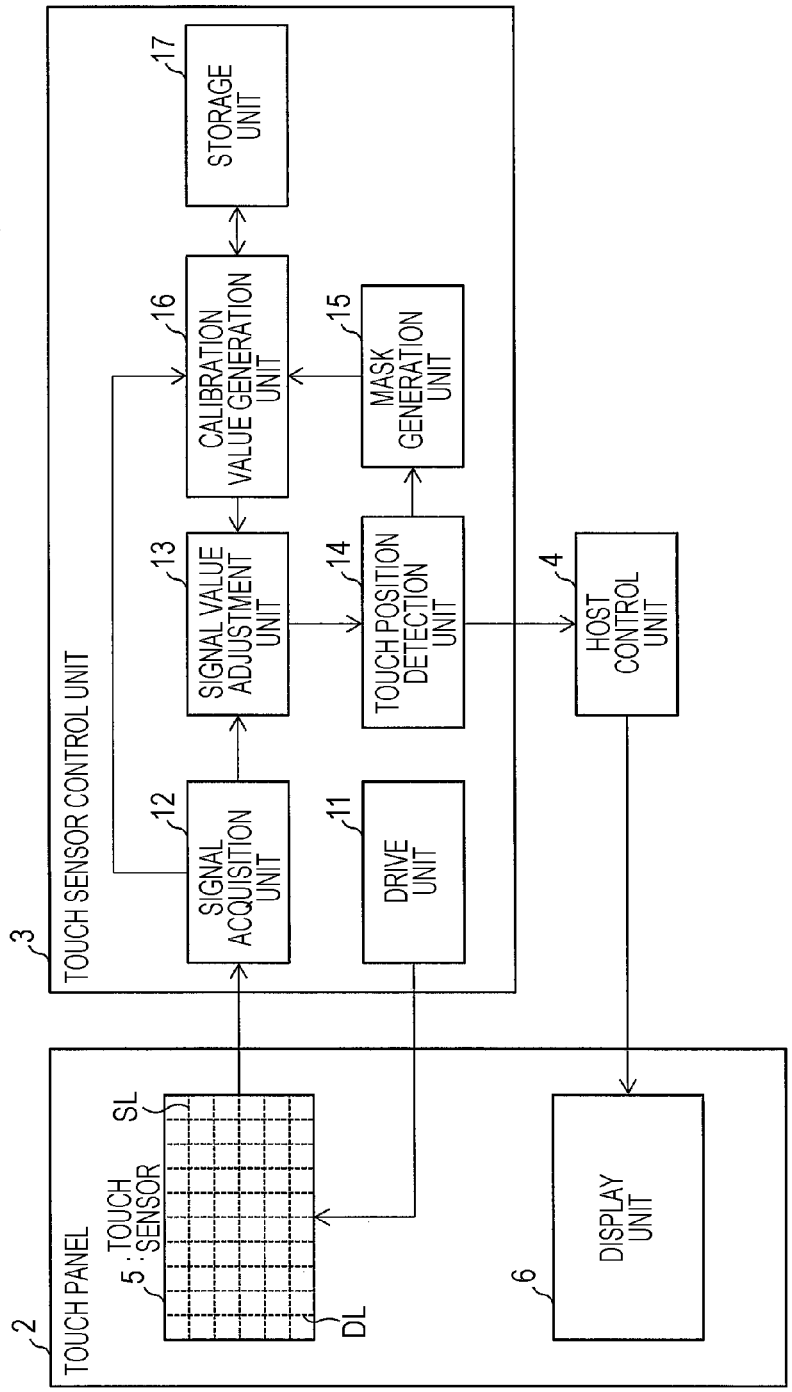
FIG. 1 is a block diagram illustrating a schematic configuration of an electronic information apparatus according to one embodiment of the invention.

FIG. 1 is a block diagram illustrating a schematic configuration of an electronic information apparatus 1 according to the present embodiment. The electronic information apparatus 1 includes a touch panel 2, a touch sensor control unit 3 (touch sensor control device), and a host control unit 4. The touch panel 2 and the touch sensor control unit 3 constitute a touch panel system. Specific examples of the electronic information apparatus 1 which is provided with the touch panel include a cellular phone, a smartphone, a notebook PC (Personal Computer), a tablet terminal, an electronic book reader, a PDA (Personal Digital Assistant), a large-sized touch display, an automatic teller machine (cash machine), and the like.

(Configuration of Touch Panel)

The touch panel 2 includes a touch sensor 5 and a display unit 6. Though the touch panel 2 is a capacitive touch panel in the present embodiment, a type thereof is not limited thereto.

The touch sensor 5 is a position input device which is arranged so as to be superimposed on the display unit 6. The touch sensor 5 includes a plurality of sense signal lines SL which extend along a horizontal direction and a plurality of drive signal lines DL which extend along a vertical direction. An electrostatic capacitance is formed at each of intersections of the sense signal lines SL and the drive signal lines DL which overlap with each other. Note that, the sense signal lines SL and the drive signal lines DL do not necessarily extend along the horizontal direction and the vertical direction, respectively.

The display unit 6 is a liquid crystal display device or a display device such as an organic EL display, but is not limited thereto.

(Configuration of Host Control Unit)

The host control unit 4 mainly performs control of the electronic information apparatus 1 serving as a host. The host control unit 4 receives information of a touch position, which is detected by the touch sensor control unit 3, and performs processing based on the touch position. Moreover, the host control unit 4 supplies display data to be displayed on the display unit 6 and performs display control of the display unit 6.

(Configuration of Touch Sensor Control Unit)

The touch sensor control unit 3 drives the touch sensor 5 and detects the touch position touched by an indicator with respect to the touch sensor 5. The touch sensor control unit 3 includes a drive unit 11, a signal acquisition unit 12 (signal acquisition unit), a signal value adjustment unit 13 (signal value adjustment unit), a touch position detection unit 14 (touch position specification unit), a mask generation unit 15 (mask setting unit), a calibration value generation unit 16 (calibration unit), and a storage unit 17.

The drive unit 11 supplies a drive signal to the plurality of drive signal lines DL of the touch sensor 5 at a predetermined timing when detection of the indicator (for example, a finger of a user, a stylus pen, or the like) is performed. In addition, the drive unit 11 supplies a drive signal to the plurality of drive signal lines DL of the touch sensor 5 at a predetermined timing when a calibration operation of detection sensitivity is performed.

The signal acquisition unit 12 acquires (detects) sense signals, which are output from the plurality of sense signal lines SL according to the drive signal. When the indicator is in contact with or proximate to a detection surface (surface) of the touch sensor 5, a capacitance value of the electrostatic capacitance formed at each of the intersections (detection points) of the sense signal lines SL and the drive signal lines DL changes. Accordingly, values of the sense signals obtained from the sense signal lines SL change according to the capacitance values of the electrostatic capacitances of the detection points. The signal acquisition unit 12 acquires the sense signals corresponding to a plurality of detection points in accordance with combinations of the plurality of drive signal lines DL and the plurality of sense signal lines SL. The signal acquisition unit 12 generates two-dimensional sense data which corresponds to the detection surface of the touch sensor 5 and represents the values of the sense signals.

The signal acquisition unit 12 outputs the sense data to the signal value adjustment unit 13. During the calibration operation, the signal acquisition unit 12 outputs the sense data also to the calibration value generation unit 16 in addition to the signal value adjustment unit 13. The sense data to be output may be digital values converted correspondingly to values of the sense signals. Each element of the two-dimensional sense data represents a sense signal value, and corresponds to a capacitance value of an electrostatic capacitance of a corresponding detection point. That is, each element of the two-dimensional sense data has a value corresponding to presence or absence of the indicator which is in contact with or proximate to each of the detection points.

The signal value adjustment unit 13 adjusts the values of the sense data based on calibration data of detection sensitivity, which is stored. The calibration data has a reference value (for example, an average value) of the sense signal value which is acquired in a non-indicated state for each of the detection points. The calibration data is two-dimensional data including the reference value of each of the detection points. The non-indicated state is a state where there is no indicator which is in contact with or proximate to the detection surface. The signal value adjustment unit 13 generates an adjusted signal value, for example, by subtracting the reference value indicated by the calibration data from the sense signal value of the sense data for each of the detection points. When the calibration data is proper, the adjusted signal value in the non-indicated state falls within a fixed range (here, −10 to +10) at the plurality of detection points. For example, an adjusted signal value of a detection point where the indicator is not in contact or proximate becomes −10 to +10, and an adjusted signal value of a detection point where the indicator is in contact or proximate becomes a value which is more than +10. Thereby, detection sensitivity in the plurality of detection points is enabled to be uniform. The signal value adjustment unit 13 outputs the adjusted two-dimensional sense data to the touch position detection unit 14. The adjusted two-dimensional sense data has, as an element thereof, the adjusted signal values respectively corresponding to the plurality of detection points.

The touch position detection unit 14 specifies a touch position on the detection surface, where an indicator 7 is in contact or proximate, based on the adjusted sense data. The touch position detection unit 14 may specify, as the touch point, a position corresponding to a detection point whose adjusted signal value is maximum (peak) and equal to or more than a predetermined threshold, for example. Moreover, the touch point detection unit 14 may specify, as the touch position, a position corresponding to a detection point whose adjusted signal value is equal to or more than the predetermined threshold. The touch position detection unit 14 may specify a plurality of positions as the touch positions in accordance with the peak of the adjusted signal values.

During a normal operation of detecting the touch position, the touch position detection unit 14 outputs information indicating the specified touch position to the host control unit 4. On the other hand, during the calibration operation, the touch position detection unit 14 outputs the information indicating the specified touch position also to the mask generation unit 15 in addition to the host control unit 4. In the case of not being able to detect a contact or proximity of the indicator 7, to the host control unit 4 or the mask generation unit 15, the touch position detection unit 14 performs an output indicating that there is no touch.

The mask generation unit 15 sets a mask region according to the specified touch position. Here, the mask region includes the touch position and a surrounding region of the touch position. For example, the mask region is a predetermined range with the touch position as the center thereof. In a case where a plurality of touch positions are specified, the mask generation unit 15 sets a plurality of mask regions corresponding to the plurality of touch positions. The mask generation unit 15 outputs information indicating the specified mask region to the calibration value generation unit 16.

The calibration value generation unit 16 generates new calibration data based on the sense data received from the signal acquisition unit 12, which is not adjusted, the mask region, and former calibration data. The calibration value generation unit 16 causes the storage unit 17 to store the generated calibration data, and outputs the generated calibration data to the signal value adjustment unit 13. The calibration value generation unit 16 causes the storage unit 17 to also store temporary calibration data which is generated in a process of generating the calibration data. The calibration value generation unit 16 reads these data which the storage unit 17 is caused to store, as necessary. A method by which the calibration value generation unit 16 generates the calibration data will be described in detail below.

(Summary of Calibration Operation)

Figure 2:
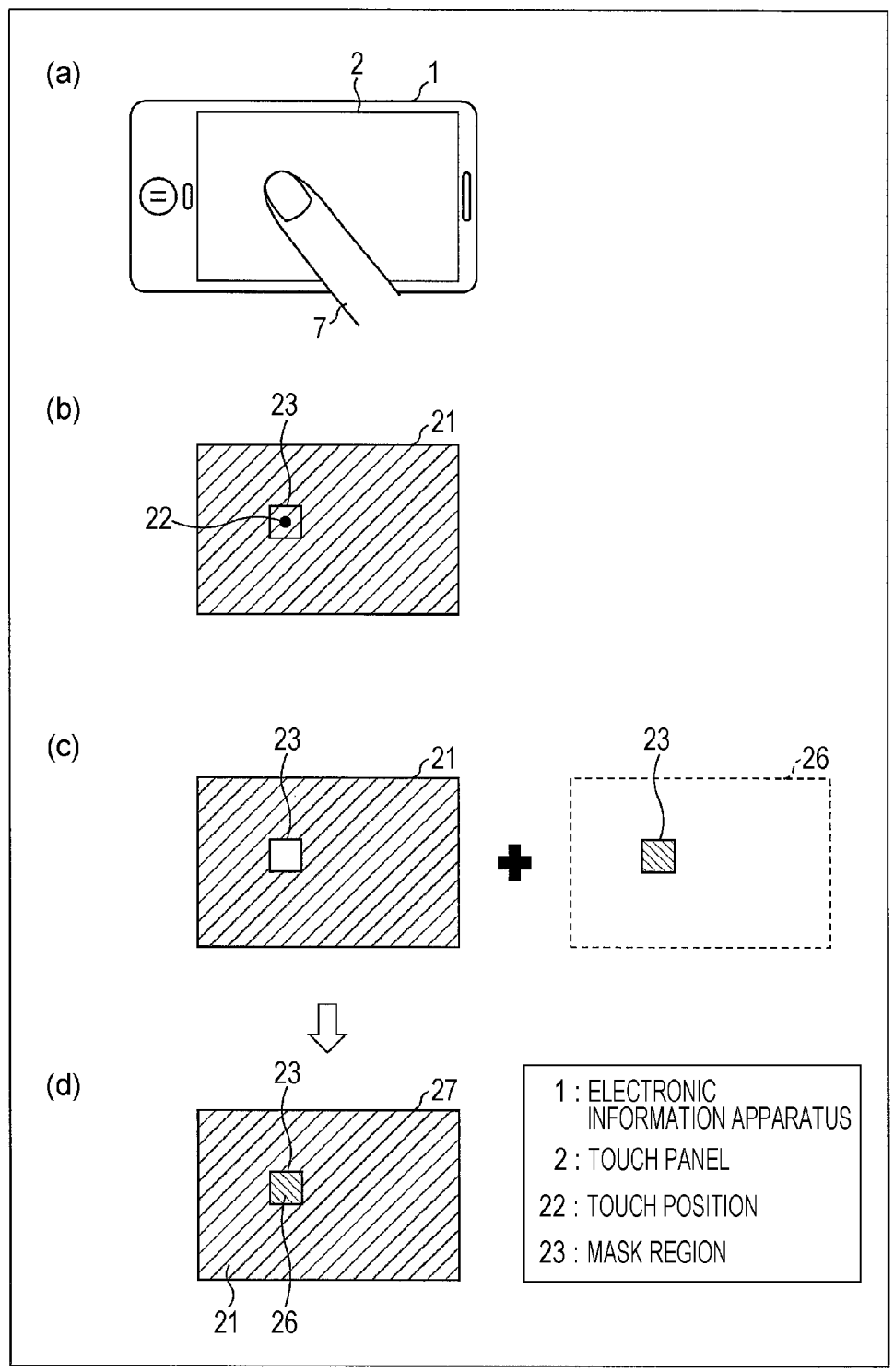
FIG. 2 is a view for explaining a summary of a generating method of calibration data in the one embodiment of the invention.

FIG. 2 is a view for explaining a summary of a generating method of calibration data in the present embodiment. FIG. 2(*a*) illustrates a state where the indicator 7 (the finger of the user) is in contact with a screen (detection surface) of the touch panel 2 of the electronic information apparatus 1.

FIG. 2(*b*) illustrates two-dimensional sense data 21 which is obtained in the state where the indicator 7 is in contact. A point with which the indicator 7 is in contact is a touch position 22. At the touch position 22, a value of the sense data (a sense signal value which is not adjusted) is great. Moreover, also in a surrounding region of the touch position 22, a value of the sense data is great to some extent. A predetermined region with the touch position 22 as the center thereof is set to be a mask region 23. The mask region 23 includes a region whose value of the sense data changes due to the contact or proximity of the indicator 7.

FIG. 2(*c*) illustrates the two-dimensional sense data 21 which is masked. In the two-dimensional sense data 21, data of the mask region 23 is eliminated (masked). On the other hand, data corresponding to the mask region 23 is extracted from calibration data 26 which was generated in the past (for example, last time).

When the sense data 21 which is masked and the data extracted from the past calibration data 26 are combined, temporary calibration data 27 which is two-dimensional is generated (FIG. 2(*d*)). In the temporary calibration data 27, data of the sense data 21, which is generated in calibration of this time, is used for a region except the mask region 23. In the temporary calibration data 27, the data of the calibration data 26, which was generated in the past calibration, is used for the mask region 23. Note that, also in a case where a plurality of mask regions 23 are set, similar processing is performed for each of the mask regions 23.

An influence due to the contact or the proximity of the indicator 7 in the mask region 23 is removed from the temporary calibration data 27 obtained in such a manner. Further, in the region of the temporary calibration data 27 except the mask region 23, the latest sense signal is reflected, that is, the latest electrostatic capacitance value of the touch sensor 5 is reflected.

Figure 3:
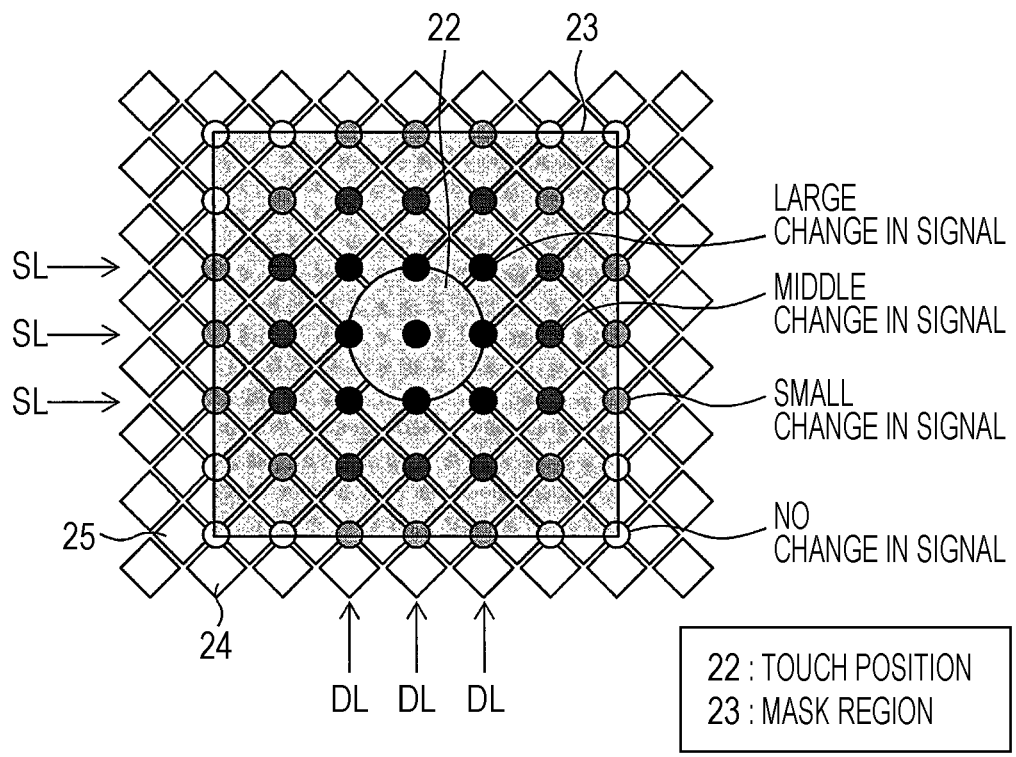
FIG. 3 is a plan view illustrating a region of a touch sensor, which corresponds to a mask region of FIG. 2, with enlargement.

FIG. 3 is a plan view illustrating a region of the touch sensor 5, which corresponds to the mask region 23 of FIG. 2, with enlargement. The drive signal lines DL include a plurality of square electrodes 24 which are continuously arranged in the vertical direction. The sense signal lines SL include a plurality of square electrodes 25 which are continuously arranged in the horizontal direction. The electrodes 24 and 25 may be formed of transparent electrodes, and may be formed of lattice-like metal wirings. In FIG. 3, each of the intersections (detection points) of the drive signal lines DL and the sense signal lines SL is marked with a circle. Note that, depth of the circle indicates a magnitude of an influence (a change in a sense signal value) by the contact of the indicator 7. A detection point which is closer to the touch position 22 has a greater change of a sense signal value.

For example, a rectangular region, which is formed by detection points within three pitches in the vertical direction and in the horizontal direction with the touch position 22 as the center, is set to be the mask region. In a case where a pitch between the signal lines is 5 mm, a 3 cm×3 cm square region on the detection surface is included in the mask region. In a case where a region having at least 3 cm in a longitudinal direction and 3 cm in a lateral direction is set as the mask region, it is possible to mask a region in which sense signal values change when the indicator 7 is a finger.

Note that, an upper limit of an area of the mask region may be set to be equal to or less than a predetermined proportion with respect to an area of the detection surface. A region which includes the touch position and in which a change of a sense signal value is equal to or more than a predetermined value may be the mask region. At this time, the upper limit of the area of the mask region may be, for example, ⅕ of the area of the detection surface. In a case where a proportion of the area of the mask region with respect to the detection surface exceeds ⅕, since noise of a non-touched region (region with which the indicator is not in contact) due to crosstalk becomes remarkable, it becomes difficult to properly correct the touch sensor. Therefore, in a case where a proportion of the region (or the mask region) in which the change of the sense signal value is equal to or more than the predetermined value exceeds the upper limit (⅕), the touch sensor control unit 3 is also able to stop the calibration operation.

(Flow of Calibration Operation)

Figure 4:
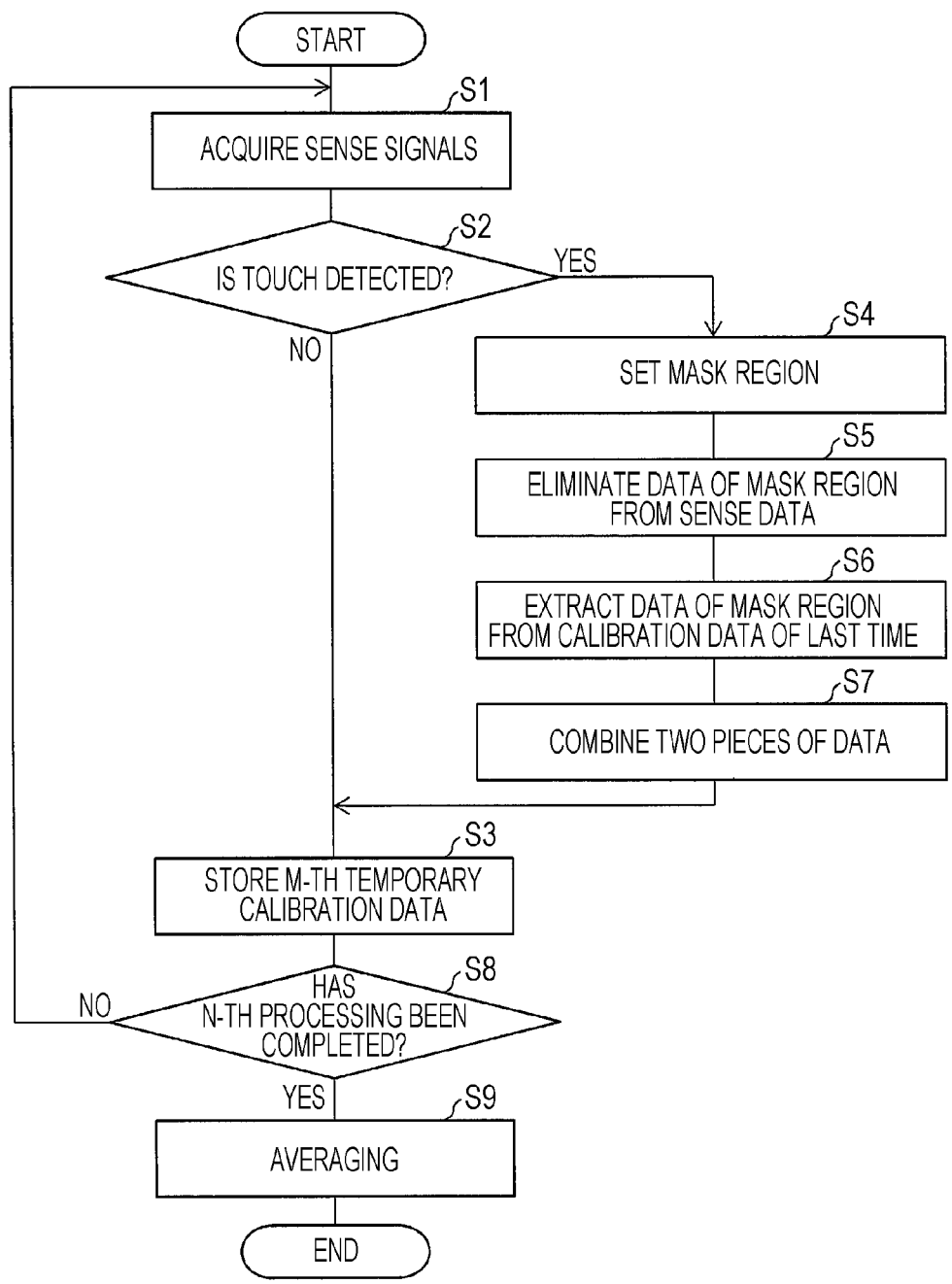
FIG. 4 is a view illustrating a flow of a calibration operation according to the one embodiment of the invention.

FIG. 4 is a view illustrating a flow of the calibration operation according to the present embodiment. The calibration operation is automatically started, for example, at a time when the electronic information apparatus 1 is activated, at a time of returning from a sleep state, and the like. In addition, the calibration operation may be automatically started every fixed period, while the electronic information apparatus 1 is operating.

When the calibration operation is started at a predetermined timing, the drive unit 11 supplies a drive signal to the plurality of drive signal lines DL of the touch sensor 5. The signal acquisition unit 12 acquires sense signals output from the plurality of sense signal lines SL according to the drive signal (step S1). The signal acquisition unit 12 generates sense data in accordance with the sense signals.

The signal value adjustment unit 13 adjusts values of the sense data based on stored calibration data (calibration data which is generated in the last calibration). The touch position detection unit 14 specifies a touch position based on the adjusted sense data.

In a case where no touch is detected (No at S2), the mask generation unit 15 does not set a mask region. The calibration value generation unit 16 causes the storage unit 17 to store the sense data (not adjusted), which is generated by the signal acquisition unit 12, as M-th temporary calibration data (S3).

In a case where a touch is detected (Yes at S2), the mask generation unit 15 sets a mask region according to a specified touch position (S4). The calibration value generation unit 16 eliminates data of the mask region from the sense data generated by the signal acquisition unit 12 (S5). Further, the calibration value generation unit 16 acquires calibration data, which was generated last time, from the storage unit 17 and extracts data corresponding to the mask region from the calibration data which was generated last time (S6). Here, the calibration value generation unit 16 may use not the calibration data obtained last time but calibration data obtained before the last time. By combining (summing) the masked sense data and the data extracted from the calibration data which was generated last time, the calibration value generation unit 16 generates temporary calibration data (S7). The calibration value generation unit 16 causes the storage unit 17 to store the generated temporary calibration data as M-th (1≤M≤N, M and N are integers) temporary calibration data (S3).

The touch sensor control unit 3 iterates processing from S1 to S7 N times (S8). That is, sense data is generated N times at different timings, and N pieces of temporary calibration data corresponding to N pieces of sense data are generated.

When the processing of generating the N pieces of temporary calibration data has been completed (Yes at S8), the calibration value generation unit 16 reads the N pieces of temporary calibration data from the storage unit 17. The calibration value generation unit 16 generates representative data of the N pieces of temporary calibration data. Specifically, the calibration value generation unit 16 averages the N pieces of temporary calibration data of each of elements (detection points), and thereby generates new calibration data (S9). Calibration data is renewed in this manner, and the renewed calibration data is used for adjustment of sense data by the signal value adjustment unit 13.

By setting the average of the plurality of pieces of temporary calibration data as the calibration data, it is possible to reduce an influence of noise. However, the number of pieces of temporary calibration data may not be limited to be plural, and one piece of temporary calibration data may be used as the calibration data as it is (in the case of N=1).

Note that, the touch position detection unit 14 specifies the touch position of the indicator 7 every N times of detection of the sense signals. In a case where the indicator 7 is moving, mask regions corresponding to a plurality of (N) pieces of sense data may be different from each other.

Further, the generation of the representative data is able to be performed also by obtaining a certain representative value (for example, a middle value or the like) as to each of the elements instead of an average value.

(Effect)

Figure 5:
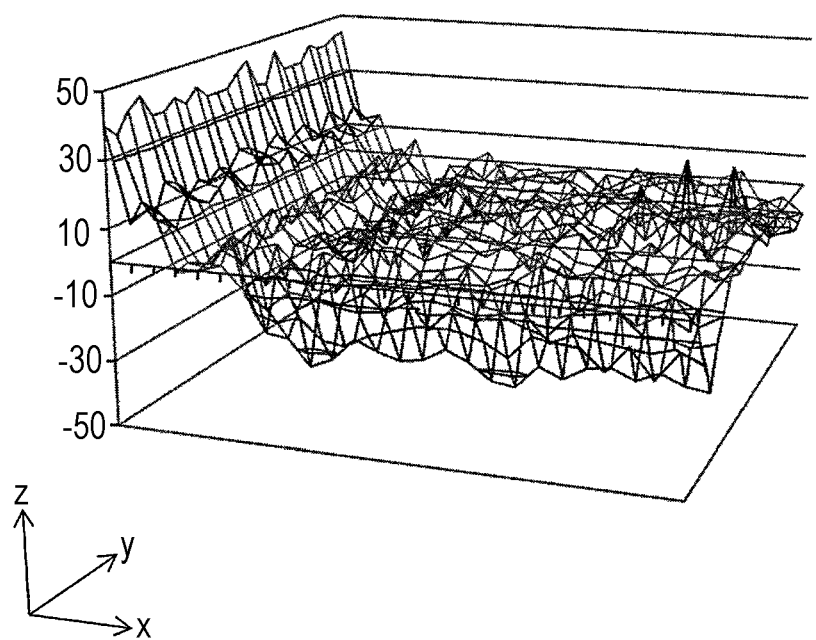
FIG. 5 is a graph illustrating one example of sense data before adjustment, in a non-indicated state.

FIG. 5 is a graph illustrating one example of sense data before adjustment, in the non-indicated state. In FIG. 5, an x axis indicates a coordinate in the horizontal direction, a y axis indicates a coordinate in the vertical direction, and a z axis indicates a value of a sense signal. Even in a case where the indicator 7 is not in contact or proximate, values of sense data which is not adjusted are not uniform generally. This non-uniformity results from, for example, presence of a conductive body such as metal in a vicinity of the drive signal line DL or the sense signal line SL, non-uniformity of a structure of the touch panel 2, temperature distribution, or the like. In the example of FIG. 5, electrostatic capacitance values (that is, sense signal values) are greater at positions along the leftmost drive signal line DL than those of the other positions. When adjustment of the sense data by using the calibration data is not performed, there is a possibility that the touch position is erroneously recognized.

Figure 6:
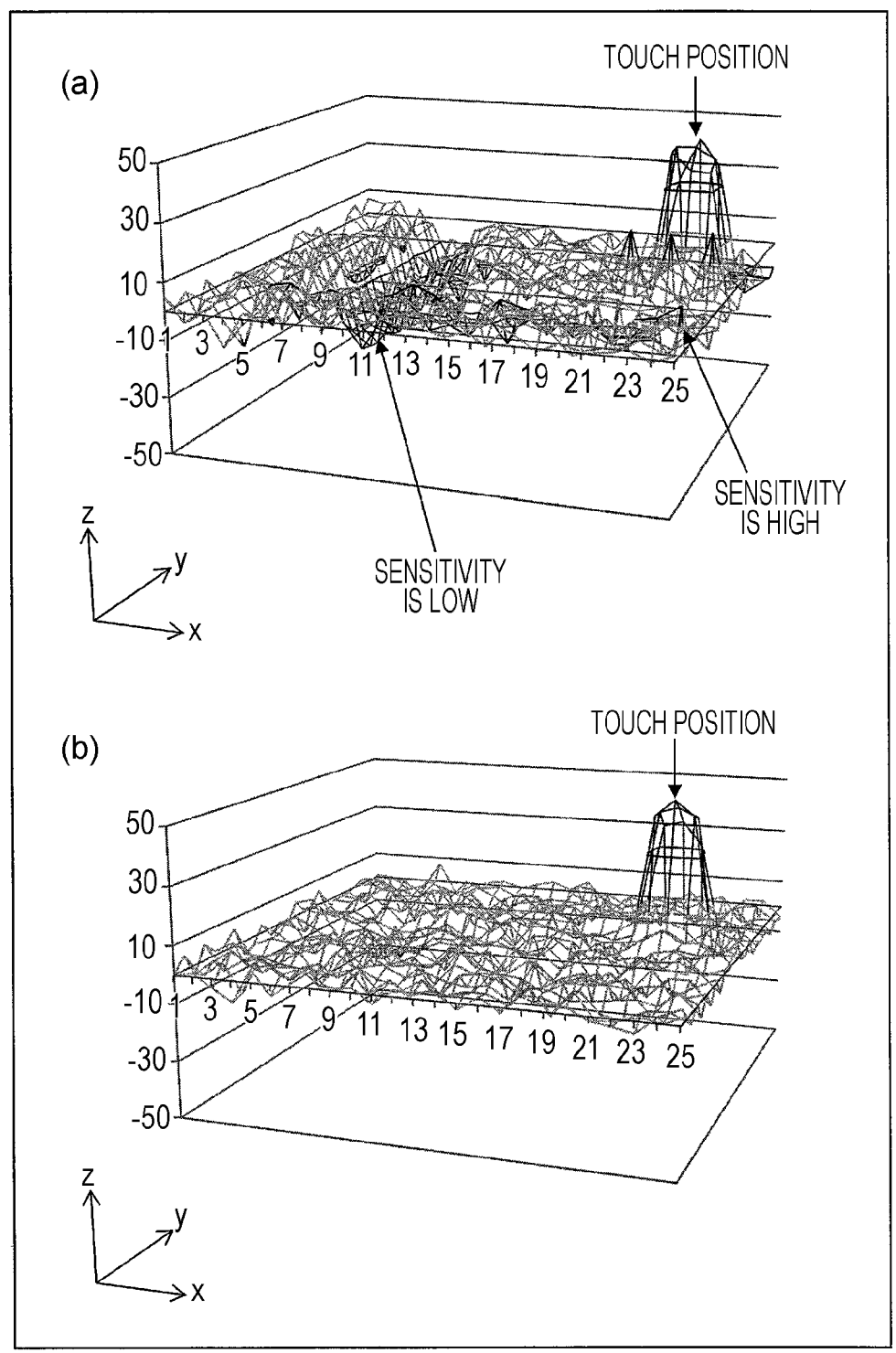
FIG. 6 is a graph illustrating one example of sense data adjusted by using the calibration data.

FIG. 6 is a graph illustrating one example of sense data adjusted by using calibration data. Note that, in the example illustrated in FIG. 6, the indicator 7 is in contact near an upper right part of the detection surface. FIG. 6(a) illustrates sense data adjusted by using calibration data which has not been renewed for a long time. FIG. 6(b) illustrates sense data adjusted by using calibration data which has been renewed appropriately. In FIG. 6, each axis indicates the same one as that of FIG. 5. Note that, in FIG. 6, values of the sense data, whose line has a color of gray, are within a range of −10 to +10, and values of the sense data, whose line has a color of black, are out of the aforementioned range.

As illustrated in FIG. 6(b), in the sense data adjusted by using the calibration data which has been renewed appropriately, values of the sense data are uniform at positions where the indicator 7 is not in contact or proximate. For example, at the positions where the indicator 7 is not in contact or proximate, the values of the sense data fall between −10 and +10. Thus, by comparing the values of the adjusted sense data with a threshold, it is possible to accurately specify the touch position.

However, in a case where calibration (renewal of calibration data) has not been performed for a long time, as illustrated in FIG. 6(a), the values of the adjusted sense data are not uniform even at the positions where the indicator 7 is not in contact or proximate. At a position where a value of the adjusted sense data is small in the non-indicated state, sensitivity of a touch becomes low. Conversely, at a position where a value of the adjusted sense data is great in the non-indicated state, the sensitivity of a touch becomes high. An electrostatic capacitance value of a detection point changes due to a change in temperature, a change with time, and the like. Therefore, in a case where calibration has not been performed for a long time, calibration data becomes inappropriate, and the values of the adjusted sense data in the non-indicated state become non-uniform.

According to the present embodiment, as to a region except a touch position where the indicator 7 is in contact or proximate, it is possible to renew calibration data based on the latest sense signals. Moreover, as to the touch position, it is possible to remove an influence of the contact or the proximity of the indicator 7 by using calibration data of the past (the last time). Thus, even in a case where the indicator 7 is in contact with or proximate to the touch panel 2, the touch sensor control unit 3 is able to perform calibration appropriately. Therefore, the touch sensor control unit 3 is able to appropriately perform calibration at a desired timing. As a result thereof, it is possible to obtain the adjusted sense data, in which the values at the positions where the indicator 7 is not in contact or proximate are uniform as illustrated in FIG. 6(b), by using the appropriate calibration data. Further, the touch sensor control unit 3 is able to execute calibration while receiving an input of a position by the indicator 7. Furthermore, though the human sensor is required in addition to the touch sensor in the configuration described in PTL 1, the touch sensor control unit 3 of the present embodiment does not require any other sensor.

Embodiment 2

In Embodiment 1, every N times of detection of sense signals, the touch position and the mask region are specified based on the M-th sense data, and the mask region is applied to the M-th sense data. However, in a case where it takes time to specify the touch position and specify the mask region, there is a case where the specification of the mask region is not completed in time. That is, there is a case where, when the mask region is specified based on the M-th sense data, generation of next (M+1)th sense data is being performed. Moreover, the old (M-th) sense data is deleted due to a limitation of a memory in some cases. In a case where the indicator is not moving, there is no problem even when the mask region is applied to the (M+1)th sense data based on the M-th sense data. However, in a case where the indicator is moving, there is a possibility that the mask region is not able to mask a touch position in the (M+1)th sense data.

Then, in the present embodiment, the touch sensor control unit sets a mask region by estimating a motion of the indicator. Since the configuration of the electronic information apparatus 1 is similar to that of Embodiment 1, detailed description thereof will be omitted.

(Summary of Calibration Operation)

Figure 7:
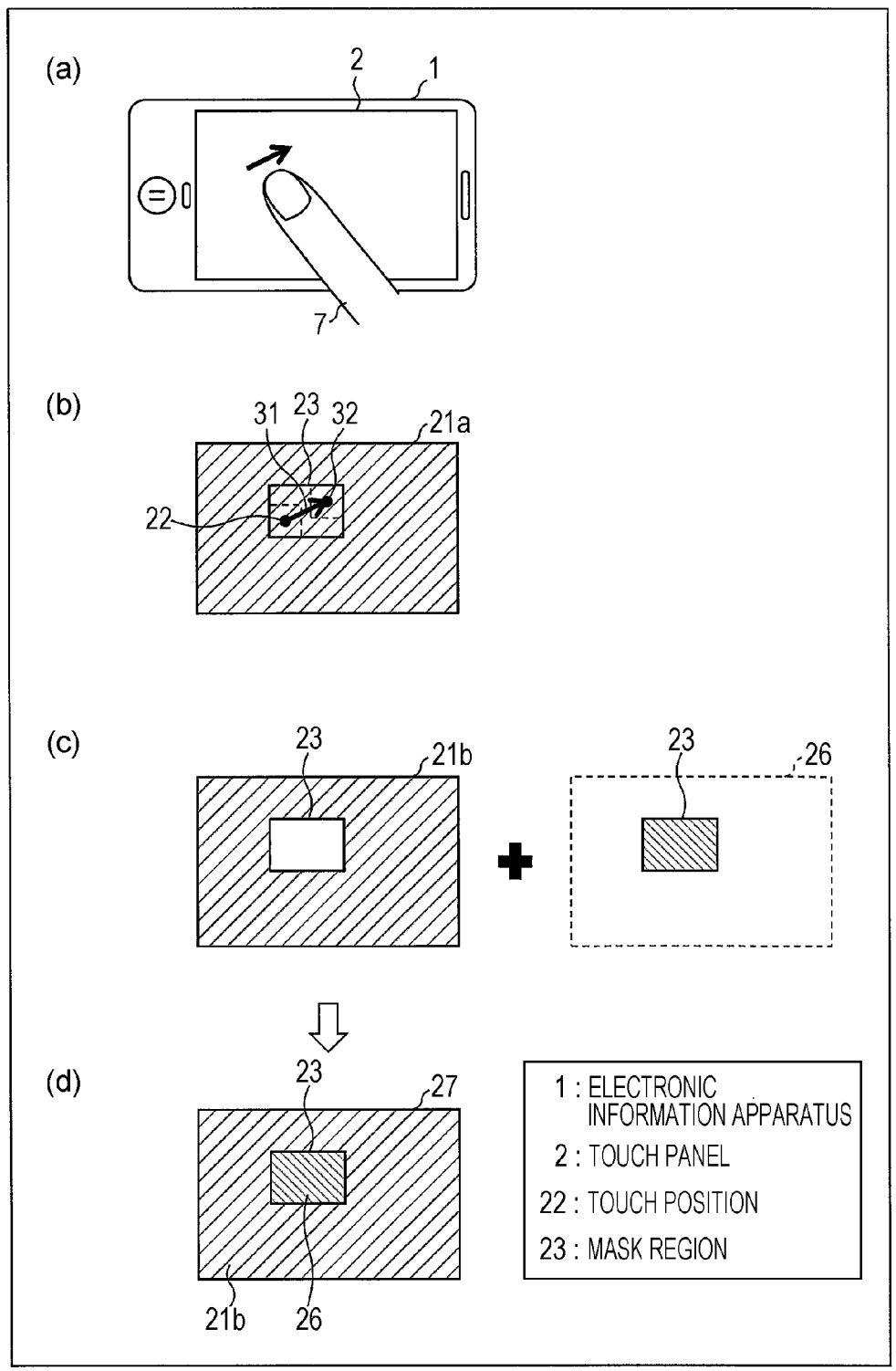
FIG. 7 is a view for explaining a summary of a generating method of calibration data in another embodiment of the invention.

FIG. 7 is a view for explaining a summary of a generating method of calibration data in the present embodiment. FIG. 7(a) illustrates a state where the indicator 7 (a finger of a user) is in contact with the screen (detection surface) of the touch panel 2 of the electronic information apparatus 1. Here, the indicator 7 moves in a direction of an arrow in the figure. Detection of the sense signals is performed every fixed interval (for example, every 1/120 second or every 1/200 second), and the detection of the sense signals is performed, for example, at times t0, t1, and t2.

FIG. 7(b) illustrates two-dimensional sense data 21a of the time t1. A touch position at the time t1 is the touch position 22. The mask generation unit 15 obtains a motion vector 31 representing a motion of a touch position, based on touch positions at the time t0 and the time t1. The mask generation unit 15 is able to estimate a touch position 32 at the time t2, which is later than the time t1, from the touch position 22 at the time t1 and the motion vector 31. The touch position 32 represents an arrival position at which the indicator is estimated to arrive at the time t2. The mask region 23 is set so as to include the estimated touch position 32 at the time t2 and a surrounding region thereof. In this case, the mask region 23 is a rectangular region including the touch position 22 at the time t1 and a surrounding region thereof and the touch position 32 at the time t2 and the surrounding region thereof. In FIG. 7(b), the surrounding regions are indicated by being surrounded with dotted lines. The mask region 23 generated based on the sense data of the time t1 includes a region where the indicator 7 is estimated to be in contact or proximate at the time t2.

The mask region 23 includes the touch position 22 of the time t1 up to the touch position 32 of the time t2, which is estimated with the motion vector 31. Accordingly, even in a case where the motion of the indicator 7 changes (stops) after the time t1, the mask region 23 is able to include a position of the indicator 7 at the time t2.

FIG. 7(c) illustrates two-dimensional sense data 21b of the time t2, which is masked. In the two-dimensional sense data 21b, data of the mask region 23 is eliminated (masked). On the other hand, data corresponding to the mask region 23 is extracted from the calibration data 26 which was generated in the past (the last time).

When the masked sense data 21b and the data extracted from the past calibration data 26 are combined, the temporary calibration data 27 which is two-dimensional is generated (FIG. 7(d)). In the temporary calibration data 27, data of the sense data 21b, which is generated in calibration of this time, is used for a region except the mask region 23. In the temporary calibration data 27, the data of the calibration data 26, which was generated in the past calibration, is used for the mask region 23. Note that, also in a case where a plurality of mask regions 23 are set, similar processing is performed for each of the mask regions 23.

(Flow of Calibration Operation)

Figure 8:
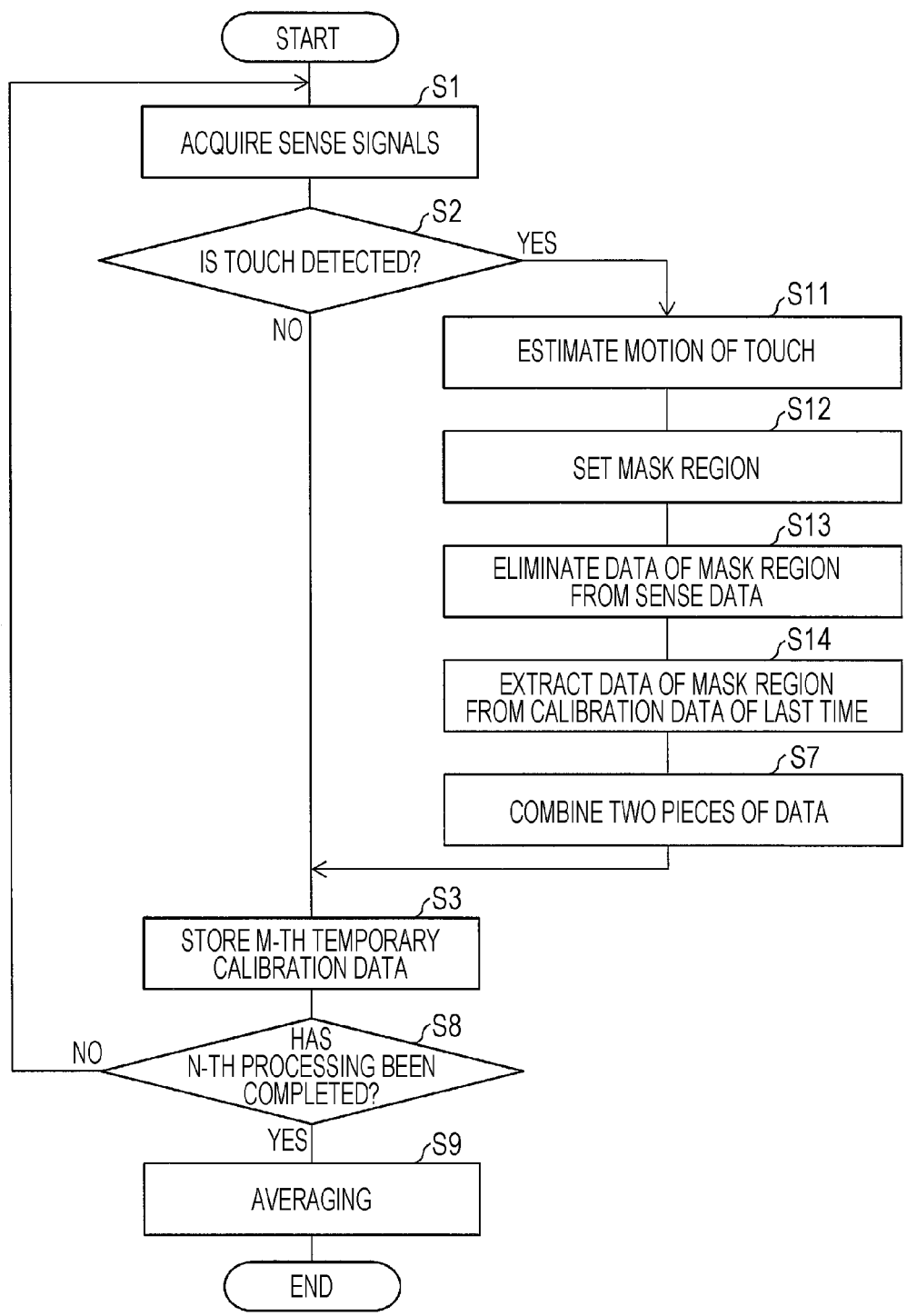
FIG. 8 is a view illustrating a flow of a calibration operation according to the another embodiment.

FIG. 8 is a view illustrating a flow of a calibration operation according to the present embodiment. Note that, it is set that the time t1 is later than the time t0 and the time t2 is later than the time t1. Since processing of S2 and S7 to S9 is similar to that of Embodiment 1, description thereof will be omitted as appropriate.

In order to detect a touch position, the drive unit 11 supplies a drive signal to the plurality of drive signal lines DL of the touch sensor 5 at a fixed interval. At each of the times, the signal acquisition unit 12 acquires sense signals output from the plurality of sense signal lines SL according to the drive signal (step S1). The signal acquisition unit 12 generates sense data in accordance with the sense signals.

The signal value adjustment unit 13 adjusts values of the sense data based on stored calibration data of the last time. The touch position detection unit 14 specifies the touch position based on the adjusted sense data.

In a case where no touch is detected (No at S2), the mask generation unit 15 does not set a mask region. The calibration value generation unit 16 causes the storage unit 17 to store the sense data (not adjusted), which is generated by the signal acquisition unit 12, as M-th temporary calibration data (S3).

In a case where a touch is detected in the adjusted sense data at both of the time t0 and the time t1 (Yes at S2), the mask generation unit 15 estimates a motion of the touch (S11). Specifically, the mask generation unit 15 specifies a motion vector representing a motion of the touch position (or the indicator) based on the touch position of the time t0 and the touch position of the time t1. Note that, the mask generation unit 15 stores the past touch position (at the time t0) for generating the motion vector. In addition, the mask generation unit 15 sets the mask region so as to include an estimated touch position of the time t2, according to the touch position of the time t1 and the motion vector (S12).

After S12, the calibration value generation unit 16 eliminates data of the mask region, which is set based on the touch position of the time t1, from the sense data of the time t2 (S13). Further, the calibration value generation unit 16 acquires calibration data, which was generated last time, from the storage unit 17 and extracts data corresponding to the mask region from the calibration data which was generated last time (S14). By combining the masked sense data and the data extracted from the calibration data which was generated last time, the calibration value generation unit 16 generates temporary calibration data (S7). The calibration value generation unit 16 causes the storage unit 17 to store the generated temporary calibration data as M-th (1≤M≤N, M and N are integers) temporary calibration data (S3).

(Effect)

According to the present embodiment, the touch sensor control unit 3 estimates the motion of the touch position, and thereby estimates the touch position as to the latest sense data. The touch sensor control unit 3 sets the mask region so as to include the estimated touch position. The touch sensor control unit 3 applies the mask region determined based on the past sense data to the latest sense data. Thereby, even in a case where it takes time to perform processing of specifying the touch position and specifying the mask region, it is possible to appropriately perform calibration by removing an influence of the moving indicator. In addition, when the touch position moves, a position of the mask region changes each time of acquisition of the sense data. For example, a mask region (a region to which past calibration data is applied) in first temporary calibration data does not correspond to a mask region but to a region, to which the latest sense data is applied, in second temporary calibration data. Accordingly, by averaging a plurality of pieces of temporary calibration data, it is possible to reflect the latest sense data in the calibration data on the whole of the detection surface.

Note that, the mask generation unit 15 may estimate the motion of the touch position not only from sense data at two times but also from sense data at three or more times.

The mask region includes the estimated future touch position (at the time t2). It is preferable that the mask region include the estimated touch position and a surrounding region thereof. The mask region may not always include the present touch position (at the time t1) or a surrounding region thereof. The mask region is not required to have a rectangular shape, and may have any shape including the estimated touch position, such as an elliptical shape or any polygonal shape, for example.

Further, in consideration of an increase or a decrease of the motion of the indicator 7, a region having the estimated future touch position (32 of FIG. 7) as the center thereof and including at least the present touch position (22 of FIG. 7) may be set as the mask region. That is, the mask region 23 may be further expanded in an upper right direction (direction of the motion vector) in FIG. 7(b) so that the estimated future touch position (32 of FIG. 7) is at the center of the mask region.

[Implementation Example by Software]

A control block of the touch sensor control unit 3 (particularly, the signal acquisition unit 12, the signal value adjustment unit 13, the touch position detection unit 14, the mask generation unit 15, and the calibration value generation unit 16) may be realized by a logic circuit (hardware) formed in an integrated circuit (IC chip) or the like, or may be realized with software by using a CPU (Central Processing Unit).

In the latter case, the touch sensor control unit 3 includes the CPU which executes a command of a program which is software for realizing each function, a ROM (Read Only Memory) or a storage device (each of which is referred to as a "recording medium") in which the program and various data are recorded so as to be readable by a computer (or the CPU), a RAM (Random Access Memory) which develops the program, and the like. When the computer (or the CPU) reads the program from the recording medium for execution, an object of the invention is achieved. As the recording medium, it is possible to use a "non-transitory tangible medium" such as, for example, a tape, a disk, a card, a semiconductor memory, or a programmable logic circuit. Moreover, the program may be supplied to the computer via any transmission medium by which the program is able to be transmitted (a communication network, a broadcast wave, or the like). Note that, the invention may be realized also in a form of a data signal in which the program is embodied by electronic transmission and which is embedded in a carrier wave.

[Summary]

A touch sensor control device (touch sensor control unit 3) according to an aspect 1 of the invention is a touch sensor control device which controls a touch sensor, including: a touch position specification unit (touch position detection unit 14) which specifies a touch position on a detection surface of the touch sensor; a mask setting unit (mask generation unit 15) which sets a mask region according to the touch position; and a calibration unit (calibration value generation unit 16) which performs, for a region of the detection surface except the mask region, calibration of detection sensitivity of a touch.

With the aforementioned configuration, the mask region is set according to the touch position, and the calibration of the detection sensitivity of a touch is performed for the region except the mask region. Thus, the touch sensor control device is able to remove an influence of a contact and proximity of an indicator and perform appropriate calibration at a desired timing.

A touch sensor control device according to an aspect 2 of the invention may be configured to include a signal acquisition unit (signal acquisition unit 12) which acquires sense signals from the touch sensor, in which, for generation of calibration data of the detection sensitivity, the calibration unit uses the acquired sense signals for the region except the mask region and uses past calibration data for the mask region, in the aspect 1.

With the aforementioned configuration, the touch sensor control device is able to renew the calibration data by, for the region except the mask region, using the acquired sense signals. Moreover, by using the past calibration data for the mask region, the touch sensor control device is able to remove the influence of the contact and the proximity of the indicator to thereby make the generated calibration data appropriate. Note that, in a case where the touch sensor is a capacitive one, values of the sense signals correspond to electrostatic capacitance values in respective positions of the detection surface.

A touch sensor control device according to an aspect 3 of the invention may be configured so that, in the aspect 1 or 2, the mask region includes a rectangular region with the touch position as a center thereof, and the rectangular region corresponds to a 3 cm×3 cm square on the detection surface.

With the aforementioned configuration, the mask region includes at least a region of the 3 cm×3 cm square with the touch position as the center thereof. Thus, the touch sensor control device is able to remove an influence of a contact and proximity by a finger of a user, a stylus pen, or the like, during the calibration.

A touch sensor control device according to an aspect 4 of the invention may be configured so that, in the aspect 2, the mask setting unit estimates an arrival position at which the touch position arrives at a certain time, and sets the mask region which includes the arrival position, and the calibration unit generates the calibration data of the detection sensitivity by using the sense signals at the time for the region except the mask region.

With the aforementioned configuration, even in a case where it takes time to perform processing of specifying the touch position and setting the mask region, it is possible to appropriately perform calibration by removing an influence of a moving indicator.

A touch sensor control device according to an aspect 5 of the invention may be configured to include a signal value adjustment unit (signal value adjustment unit 13) which adjusts values of the sense signals by using the calibration data so that adjusted sense data has values corresponding to presence or absence of an indicator which is in contact with or proximate to the detection surface and thereby generates the adjusted sense data, in which the touch position specification unit specifies the touch position from the adjusted sense data, in the aspect 2.

A touch sensor control device according to an aspect 6 of the invention may be configured so that, in the aspect 1, 2, 4, or 5, the mask region includes the touch position.

A touch sensor control device according to an aspect 7 of the invention may be configured so that, in the aspect 2 or 5, the calibration data corresponds to values of the sense signals in a case where there is no indicator which is contact with or proximity to the detection surface.

A touch panel system according to an aspect 8 of the invention may be configured to include the touch sensor control device of the aspects 1 to 7 and a touch panel provided with the touch sensor.

An electronic information apparatus according to an aspect 9 of the invention may be configured to include the touch sensor control device of the aspects 1 to 7, a touch panel provided with the touch sensor, and a host control unit which controls the electronic information apparatus based on the touch position.

A controlling method of a touch sensor according to an aspect 10 of the invention includes: a touch position specification step of specifying a touch position on a detection surface of the touch sensor; a mask setting step of setting a mask region according to the touch position; and a calibration step of performing, for a region of the detection surface except the mask region, calibration of detection sensitivity of a touch.

The touch sensor control device according to each of the aspects of the invention may be realized by a computer, and, in this case, a control program of the touch sensor control device, which causes the computer to operate as the respective units provided in the touch sensor control device to thereby realize the touch sensor control device in the computer, and a computer readable recording medium which stores the control program therein are also included in the scope of the invention.

The invention is not limited to each of the embodiments described above, and may be modified in various manners within the scope of the claims and an embodiment achieved by appropriately combining technical means disclosed in each of different embodiments is also encompassed in the technical scope of the invention. Further, by combining the technical means disclosed in each of the embodiments, a new technical feature may be formed.

INDUSTRIAL APPLICABILITY

The invention is able to be used for a touch sensor control device, a touch panel system, and an electronic information apparatus.

REFERENCE SIGNS LIST 1 electronic information apparatus
2 touch panel
3 touch sensor control device
4 host control unit
5 touch sensor
6 display unit
7 indicator
11 drive unit
12 signal acquisition unit
13 signal value adjustment unit
14 touch position detection unit (touch position specification unit)
15 mask generation unit (mask setting unit)
16 calibration value generation unit (calibration unit)
17 storage unit
22 touch position
23 mask region
DL drive signal line
SL sense signal line

The invention claimed is:

1. A touch sensor control device which controls a touch sensor, comprising:
   a touch position specification unit which specifies a touch position on a detection surface of the touch sensor;
   a mask setting unit which sets, according to the touch position, a mask region including both of the touch position and a surrounding region of the touch position; and
   a calibration unit which performs, for a region of the detection surface except the mask region, calibration of detection sensitivity of a touch.

2. The touch sensor control device according to claim 1, further comprising:
   a signal acquisition unit which acquires sense signals from the touch sensor, wherein
   for generation of calibration data of the detection sensitivity, the calibration unit uses the acquired sense signals for the region except the mask region and uses past calibration data for the mask region.

3. The touch sensor control device according to claim 2, further comprising:
   a signal value adjustment unit which adjusts values of the sense signals by using the calibration data such that adjusted sense data has values corresponding to presence or absence of an indicator which is in contact with or proximate to the detection surface and thereby generates the adjusted sense data, wherein
the touch position specification unit specifies the touch position from the adjusted sense data.

4. A touch sensor control device which controls a touch sensor, comprising:
a touch position specification unit which specifies a touch position on a detection surface of the touch sensor;
a mask setting unit which sets a mask region according to the touch position;
a calibration unit which performs, for a region of the detection surface except the mask region, calibration of detection sensitivity of a touch;
a signal acquisition unit which acquires sense signals from the touch sensor;
wherein for generation of calibration data of the detection sensitivity, the calibration unit uses the acquired sense signals for the region except the mask region and uses past calibration data for the mask region,
wherein the mask setting unit estimates an arrival position at which the touch position arrives at a certain time, and sets the mask region which includes the arrival position, and
the calibration unit generates the calibration data of the detection sensitivity by using the sense signals at the time for the region except the mask region.

5. The touch sensor control device according to claim 4, wherein
the mask region includes a rectangular region with the touch position as a center thereof, and
the rectangular region corresponds to a 3 cm×3 cm square on the detection surface.

6. The touch sensor control device according to claim 4, wherein
the mask region includes a rectangular region with the touch position as a center thereof, and
the rectangular region corresponds to a 3 cm×3 cm square on the detection surface.

* * * * *